May 8, 1956   W. G. BUCKNER   2,744,536
SHUT-OFF VALVE
Filed April 30, 1954   2 Sheets-Sheet 1
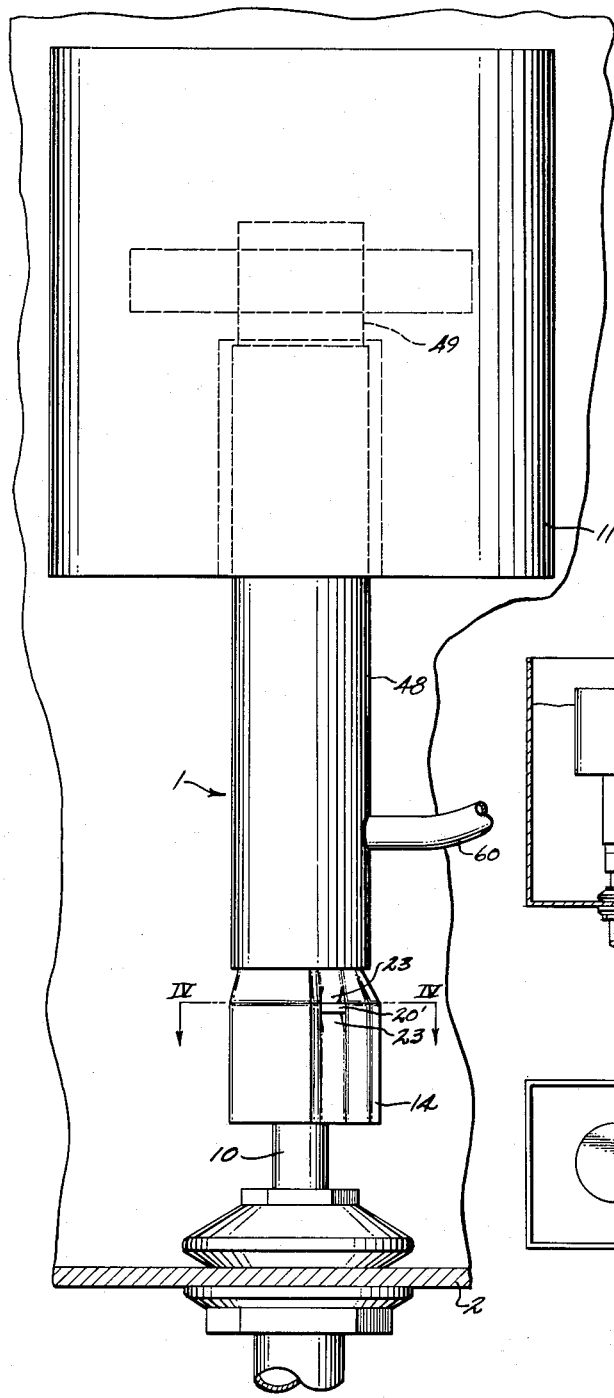
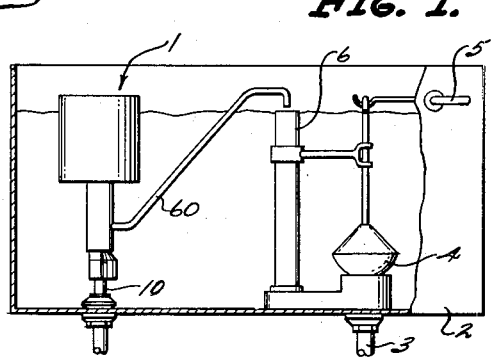
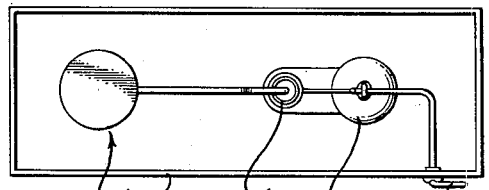
INVENTOR.
WILBUR G. BUCKNER
BY HIS ATTORNEYS.
HARRIS, KIECH, FOSTER & HARRIS May 8, 1956  W. G. BUCKNER  2,744,536
SHUT-OFF VALVE
Filed April 30, 1954  2 Sheets-Sheet 2
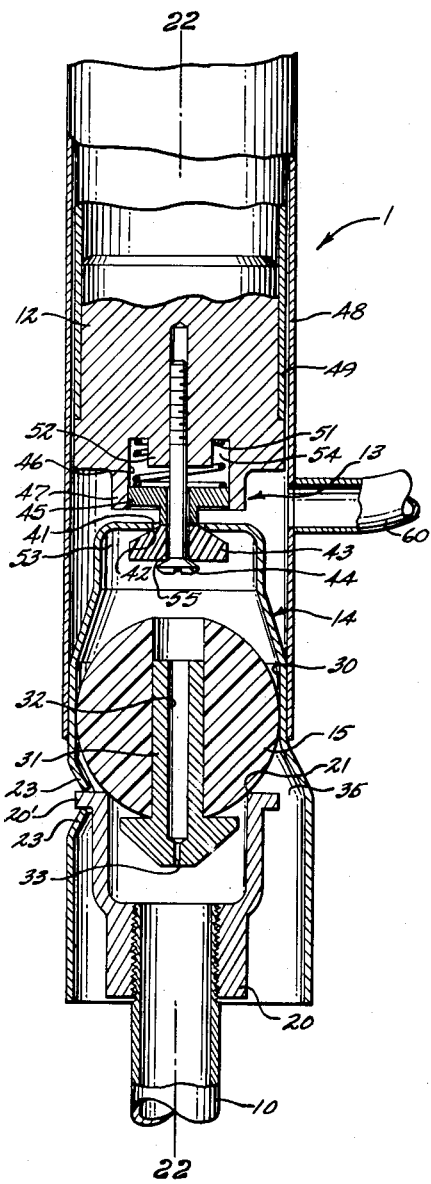
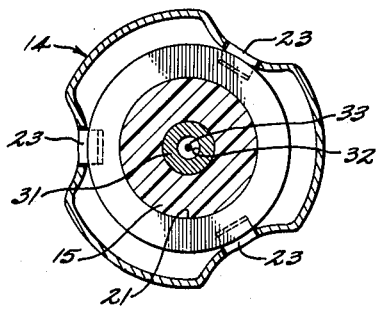
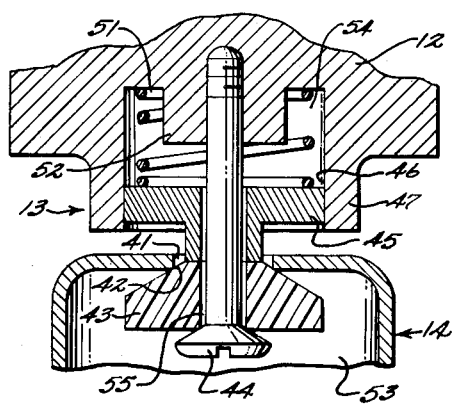
INVENTOR.
*WILBUR G. BUCKNER*
BY HIS ATTORNEYS.
*HARRIS, KIECH, FOSTER & HARRIS*

2,744,536
Patented May 8, 1956

2,744,536

SHUT-OFF VALVE

Wilbur G. Buckner, Culver City, Calif.

Application April 30, 1954, Serial No. 426,771

3 Claims. (Cl. 137—413)

This application pertains to shut-off valves which may be placed in, or connected with, a tank and through which water is admitted to fill the tank, the flow of water being shut off by the shut-off valve when the tank is filled to a predetermined level. Such a valve can, of course, be used to control fluids other than water, the word "water" being used hereinafter to include all other fluids. Similarly, the word "tank" is used to include all sorts of receiving spaces.

Terms of position used herein, such as "up" and "down," refer solely to position as viewed in the drawings.

The valve illustrated and described herein may be used in any position in relation to the center of the earth.

Shut-off valves are commonly used as a part of the mechanism used to control the flushing of water closets which, however, is one of many uses for which such a valve may be used and the shut-off valve described herein embodies inventions that may be used in many other type of valves which are or are not considered to be shut-off valves. For convenience in description, the use of such a shut-off valve in the control of flushing water used in water closets is described, this being merely the use applicant has present ly contemplated.

The invention hereinafter described and claimed may be briefly summarized as residing in the use of a spherical member formed of elastic material which slides freely in a cylinder and acts as a piston, moving axially in the cylinder through a limited movement under fluid pressure applied in said cylinder against one side of said ball, the other side of said ball closing the end of a pipe, or conduit, and shutting off the flow of liquid through said pipe when the ball is forced by pressure to one limit of said movement.

More narrowly, the invention resides in providing the fluid pressure necessary to force the valve into its closed position by passing said fluid under pressure through a constricted orifice which passes entirely through said ball.

In the drawings:

Fig. I is a sectional elevation of a tank and its associated parts which may be used to control the flushing of water closets;

Fig. II is a plan view of the tank and parts shown in Fig. I;

Fig. III is a general assembly of the shut-off valve;

Fig. IV is a section on a plane indicated by the line IV—IV in Fig. III;

Fig. V is a section through the main and pilot valves which are shown on a smaller scale in Fig. III; and Fig. VI is a section through the pilot valve which is shown in smaller scale in Figs. III and V.

All parts shown in section in any figure are cylindrical, conical, or spherical about the main vertical axis of the shut-off valve.

The main valve mechanism is best shown in Fig. V. The operation of the main valve is controlled by a pilot valve mechanism which is controlled by a float.

Referring to Fig. I, the shut-off valve 1 when used to control the flow of water in water closets is placed in a tank 2 which has an outlet pipe 3 normally closed by a hollow float dump valve 4 which closes the inlet to the outlet pipe 3. When it is desired to dump the water from the tank 2, the float dump valve 4 is lifted by pressing down on a lever 5. An overflow pipe 6 connects at its lower end with the outlet pipe 3. All this mechanism is old in water closet controls.

The shut-off valve 1 consists of a shut-off valve float 11, a head 12, a pilot valve mechanism 13, a main valve chamber 14, and a main valve 15.

A main valve seat member 20 rigidly secured to an inlet pipe 10 has a main valve seat 21 at its upper end, this seat being of circular form about a vertical axis 22—22 extending through the entire shut-off valve. The main valve chamber 14 is rigidly secured to the main valve seat 20 by three pairs of ears 23 which project inwardly from the member 14 locking over the flange 20' of the member 20.

The central portion of the main valve chamber 14 surrounds a cylindrical chamber 30 in which the main valve 15 can slide vertically for a limited distance. The main valve 15 is formed of rubber or other resilient material and is of spherical form. It should be slightly larger in diameter than the chamber 30 so that it fits tightly and resiliently therein.

Carried in a hole which passes through the main valve 15 is a conduit member 31. A hole 32 passes through the member 31, this hole being wholly or partially of a small diameter 33. The main valve seat member 20 is of such size and shape as to leave passages outside said member and inside the main valve chamber 14, these passages opening into the interior of the tank 2.

The pilot valve mechanism is shown on an enlarged scale in Fig. VI. The upper end of the main valve chamber member 14 has a central opening 41 which forms a valve seat 42 for a washer 43 which is preferably made of rubber, or other resilient material. The washer 43 has a central opening through which a screw 44 passes. This screw 44 also passes through a central opening in a pilot valve piston 45. The pilot valve piston 45 is free to move vertically in a cylindrical opening 46 in a projection 47 extending down from the head 12 which is free to move vertically in an outer tube 48 which is welded or otherwise secured at its lower end to the main valve chamber member 14. The head 12 is rigidly secured to the float 11 by an inner tube 49.

A pilot valve spring 51 surrounding a projection 52 on the head 12 and extending downwardly from the head presses downwardly on the top of the pilot valve piston 45. The screw 44 fits very loosely in the washer 43 and the piston 45 so that there is a small opening 55 extending from a space 53 inside the main valve chamber 14 and above the main valve 15 and a space 54 inside the opening 46 above the pilot valve piston 45. When the screw 44 is pulled upwardly due to an upward motion of the float 11, the head of the screw seats on the washer 43 and closes this opening 55. It also seats the washer 43 on the valve seat 42 and moves the pilot valve piston 45 against the pressure of the spring 51.

An anti-siphoning tube 60 is connected into the outer tube 48 in the space below the head 12. The tube 60 projects upwardly and discharges into the upper open end of the overflow pipe 6.

An important feature of the invention is that the main valve 15 is held solidly on the main valve seat 21 by water pressure when the tank is full and standing idle. The pilot valve having been previously closed, the space 53 above the main valve 15 is a closed space except for the opening 32 through the main valve 15 which allows water under pressure to flow from the pipe 10 into the space 53. There is then a positive differential force moving the main valve 15 downwardly, this differential force being due to the proportional difference in the cross-sectional area of the main valve 15 to the area of the main valve seat 21. The main valve is thus held by downward pressure due to differential force.

The method of operation used in flushing the toilet is as follows:

The tank having been previously filled with water, the lever 5 is depressed and the float dump valve 4 is raised from its seat. Since this float dump valve is hollow, it tends to float as the water in the tank 2 is dumped into the toilet through the pipe 3. The dump float valve 4 then drops into place, closing the opening into the pipe 3. This is the usual method used to dump the water from the tank 2. The function of the shut-off valve is to allow the tank 2 to refill to the desired level and then shut off the flow of water into the tank 2. How it does this will now be described.

The level of the water in the tank 2 during the dumping period just described falls very rapidly and the shut-off valve float 11 drops into a lower position. This moves the head 12 and the screw 44 down, opening the channel 55 around the screw 44 and allowing water to leak from the space 53 in the main valve chamber into the space 54 inside the opening 46. As soon as the pressure between this space and the space 53 equalizes, the pilot valve piston 45 moves the washer 43 downwardly off the valve seat 42 and the water in the space 53 is discharged through the overflow pipe 60. The spring 51 acts to assist the pilot valve piston 45 to operate. The water pressure in the space 53 falls allowing the water pressure at the main valve seat member 20 to lift the main valve 15 off its seat. A rapid flow of water through the channels 35 then results and the tank 2 is quickly refilled. The float 11 is lifted and the shut-off valve shuts off the flow of water.

As the float 11 rises it lifts the screw 44 so that its head closes off the opening 55 and lifts the washer 43 into contact with its seat. All exit from the space 53 then being closed, water under pressure leaks into the space 53 through the restricted opening 33 and slowly builds up the pressure in that space to the same water pressure as that below the main valve 15. The main valve is then forced down on to the seat 21 and the cycle has been completed.

I claim as my invention:

1. A valve adapted to shut off the flow of fluid into a tank when the level of fluid in said tank rises to a desired level, which comprises: walls forming a cylindrical channel which is open to said tank at its lower end; an elastic ball normally of slightly larger diameter than said channel and placed so that it can move freely in said channel between upper and lower limiting positions, said ball having a restricted opening along an axis of said ball and being at all times in contact with the walls of said channel; walls integral with the walls forming said channel and forming a chamber above said ball, said restricted opening on the axis of said ball being in open communication at all times with said chamber; an inlet pipe having a cylindrical valve seat at its upper open end, said seat being of substantially smaller diameter than the diameter of said ball and so placed that the ball can contact said valve seat and close the exit of liquid from said pipe when said ball is in its lowest position, said pipe being so placed that said pipe is in open communication with the tank through an opening below said ball when the ball is in an upper position, said ball being so placed and guided that said restricted opening provides a restricted passage from the pipe below said seat to said chamber; and means for controlling the fluid pressure in said chamber.

2. A valve adapted to shut off the flow of fluid into a tank when the level of fluid in said tank rises to a desired level, which comprises: walls forming a cylindrical channel which is open to said tank at its lower end; an elastic ball normally of slightly larger diameter than said channel and placed so that it can move freely in said channel between upper and lower limiting positions, said ball having a restricted opening along an axis of said ball; walls integral with the walls forming said channel and forming a chamber above said ball, said restricted opening on the axis of said ball being in open communication at all times with said chamber; an inlet pipe having a cylindrical valve seat at its upper open end, said seat being of substantially smaller diameter than the diameter of said ball and so placed that the ball can contact said valve seat and close the exit of liquid from said pipe when said ball is in its lowest position, said pipe being so placed that said pipe is in open communication with the tank through an opening below said ball when the ball is in an upper position, said ball being so placed and guided that said restricted opening provides a restricted passage from the pipe below said seat to said chamber; and a pilot valve so placed that when opened it can reduce the fluid pressure in said chamber.

3. A valve adapted to shut off the flow of fluid into a tank when the level of fluid in said tank rises to a desired level, which comprises: walls forming a cylindrical channel which is open to said tank at its lower end; an elastic ball normally of slightly larger diameter than said channel and placed so that it can move freely in said channel between upper and lower limiting positions, said ball having a restricted opening along an axis of said ball; walls integral with the walls forming said channel and forming a chamber above said ball, said restricted opening on the axis of said ball being in open communication at all times with said chamber; an inlet pipe having a cylindrical valve seat at its upper open end, said seat being of substantially smaller diameter than the diameter of said ball and so placed that the ball can contact said valve seat and close the exit of liquid from said pipe when said ball is in its lowest position, said pipe being so placed that said pipe is in open communication with the tank when the ball is in an upper position, said ball being so placed and guided that said restricted opening provides a restricted passage from the pipe below said seat to said chamber; a pilot valve so placed that when opened it can reduce the fluid pressure in said chamber; and a float connected to said pilot valve in such a manner that the pilot valve is closed whenever the level of liquid in the tank reaches its desired level by the action of the float rising.

References Cited in the file of this patent

UNITED STATES PATENTS

| | | |
|---|---|---|
| 571,168 | Mott | Nov. 10, 1896 |
| 1,160,441 | Packer | Nov. 16, 1915 |
| 1,551,808 | Dixon | Sept. 1, 1925 |